United States Patent
Sabo

Patent Number: 6,003,749
Date of Patent: Dec. 21, 1999

[54] INDIVIDUAL CAMOUFLAGE SYSTEM

[76] Inventor: Robert C. Sabo, 291 Indian Paintbrush #3, Casper, Wyo. 82604

[21] Appl. No.: 09/079,081

[22] Filed: May 14, 1998

Related U.S. Application Data

[63] Continuation-in-part of application No. 08/798,911, Feb. 12, 1997, abandoned
[60] Provisional application No. 60/012,045, Feb. 22, 1996.

[51] Int. Cl.[6] .............................. A45C 15/00; A41D 3/08; A41D 15/00
[52] U.S. Cl. .............................. 224/576; 224/664; 2/69.5; 2/89; 2/114; 2/900; 2/919; 2/914
[58] Field of Search .................................... 224/576, 577, 224/664; 2/69.5, 900, 919, 914, 114, 88, 89

[56] References Cited

U.S. PATENT DOCUMENTS

| | | | |
|---|---|---|---|
| 4,158,892 | 6/1979 | Gonzales | 2/69.5 |
| 4,507,805 | 4/1985 | Calutoiu | 2/69.5 |
| 4,718,122 | 1/1988 | Steverson | 2/900 |
| 5,477,875 | 12/1995 | Daly, Jr. | 2/69.5 |
| 5,564,125 | 10/1996 | Waldman et al. | 224/576 |

FOREIGN PATENT DOCUMENTS 17263 of 1915 United Kingdom ......................... 2/89

Primary Examiner—Linda J. Sholl
Attorney, Agent, or Firm—Dean P. Edmundson

[57] ABSTRACT

A multiple use camouflage system is described for use by an individual. The system is integrated into and remains attached to a fanny pack secured to a waist belt or to a backpack, etc. The camouflage system utilizes a sheet of flexible rectangular camouflage material (preferably translucent mesh netting) with spaced straps secured along one side edge and spaced D-rings on the opposite side edge. When deployed, the sheet material can be wrapped around the user and secured with the straps. A slit extends upwardly from the bottom edge toward the central section of the sheet, enabling the lower portions of the sheet to be wrapped around the users legs and secured with straps and D-rings, or the lower portions can be secured together to form a tube around the body of the user. The material can also be used off of the body as a fixed positional blind for hunting or surveillance. The material can be folded and rolled into the fanny pack for storage and carrying.

4 Claims, 3 Drawing Sheets

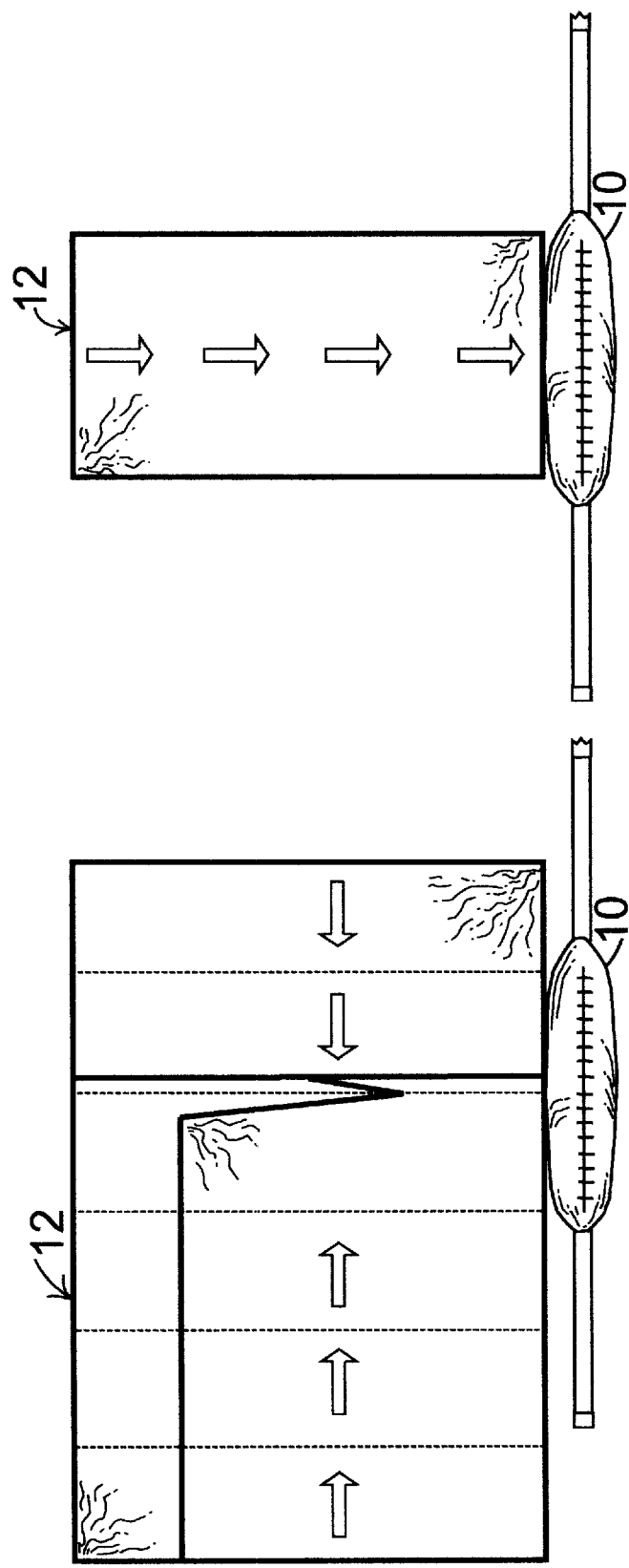

INDIVIDUAL CAMOUFLAGE SYSTEM

CROSS-REFERENCE TO RELATED APPLICATION

This application is a continuation-in-part of U.S. application Ser. No. 08/798,911, filed Feb. 12, 1997, now abandoned, which claims the benefit of U.S. Provisional Application No. 60/012,045, filed Feb. 22, 1996.

FIELD OF THE INVENTION

This invention relates to camouflage systems. More particularly, this invention relates to individual camouflage systems for use on or off the body.

BACKGROUND OF THE INVENTION

There are many situations where a person desires to be camouflaged while in the field. This is particularly important for hunters, law enforcement and military personnel, and sometimes for photographers. It is not convenient, however, to carry conventional blinds around in the field. Also, conventional blinds are not able to be easily and quickly deployed when needed. Camouflage "suits" which are available do not break up the human form and therefore are not always effective.

Although a convertible garment is described in U.S. Pat. No. 4,718,122 (Steverson), it is not suitable for all uses. It is stated to be convertible to a car coat length, raincoat length, a ground engaging length, and to a coverall (where the lower portion is wound separately around each leg) Basically the garment is a weather-resistant coat with sleeves for the arms and a body portion which extends around the trunk of the person wearing it. The length of the coat may vary by folding or unfolding the lower portion. Although such a coat may be useful for some purposes, it is not useful, for example, as a ground cover or tent for concealing the body of the wearer. Furthermore, in the form of camouflage, it does not reduce the human form.

U.S. Pat. No. 5,564,125 (Waldmann) describes an upper torso garment having sleeves for the arms, a hood, and a back pack or fanny pack secured to the back of the garment for carrying the folded garment when it is not being used. This garment would not be useful for camouflage purposes because it does not "break up" the human form. Moreover, the garment is simply a wind breaker that is not convertible to any body-covering form.

There has not heretofore been provided an individual camouflage system having the features and advantages provided by the present invention which is convertible to a variety of uses depending upon the demands of a particular situation at hand.

SUMMARY OF THE INVENTION

The present invention provides a new system for individual camouflage. The system is built into a fanny pack for ease of carry and quick release of the camouflage material. The unit is designed to automatically unroll upon the opening of the fanny pack by the user. After the flexible camouflage material is unrolled, the user can select one of four possible configurations (listed and described below) for using the system. These configurations allow for immediate release of the camouflage should the user need to become free quickly for any reason (ideal for tactical situations).

Contrary to other existing camouflage "suits" the system of the invention more effectively breaks up the human form and therefore camouflages the body more efficiently than any previous system.

The camouflage material supplied is of state of the art, ultra-light construction (2.1 lbs total weight, for example, in a preferred embodiment). It is fire-resistant (optional), and it resists snags from uniform items, brush and/or equipment items carried.

The system of this invention will produce outstanding concealment for tactical situations in any location, including Urban, Desert, Woodland, and Winter settings. The system has several advantages over prior systems, including:

1. It effectively conceals the human body in highly-elusive material.
2. The system does not interfere with complete range of motion of the user or with load-bearing capabilities;
3. Ultra-light weight, totally self-contained unit, integrated into a fanny pack, weighing approximately two pounds.
4. Deployment time is two minutes or less, and the system can be shed effortlessly in ten (10) seconds or less.
5. Manufactured with state of the art ultra-light camouflage material, which is fire resistant (optionally), and it will not snag on uniform articles.

Other features and advantages will be apparent from the following detailed description.

BRIEF DESCRIPTION OF THE DRAWINGS

FIGS. 2B, 2C and 2D illustrate one manner in which the system can be folded for storage in a fanny pack which is secured to the central area on one side of the camouflage material.

DETAILED DESCRIPTION OF THE INVENTION

Figure 1:
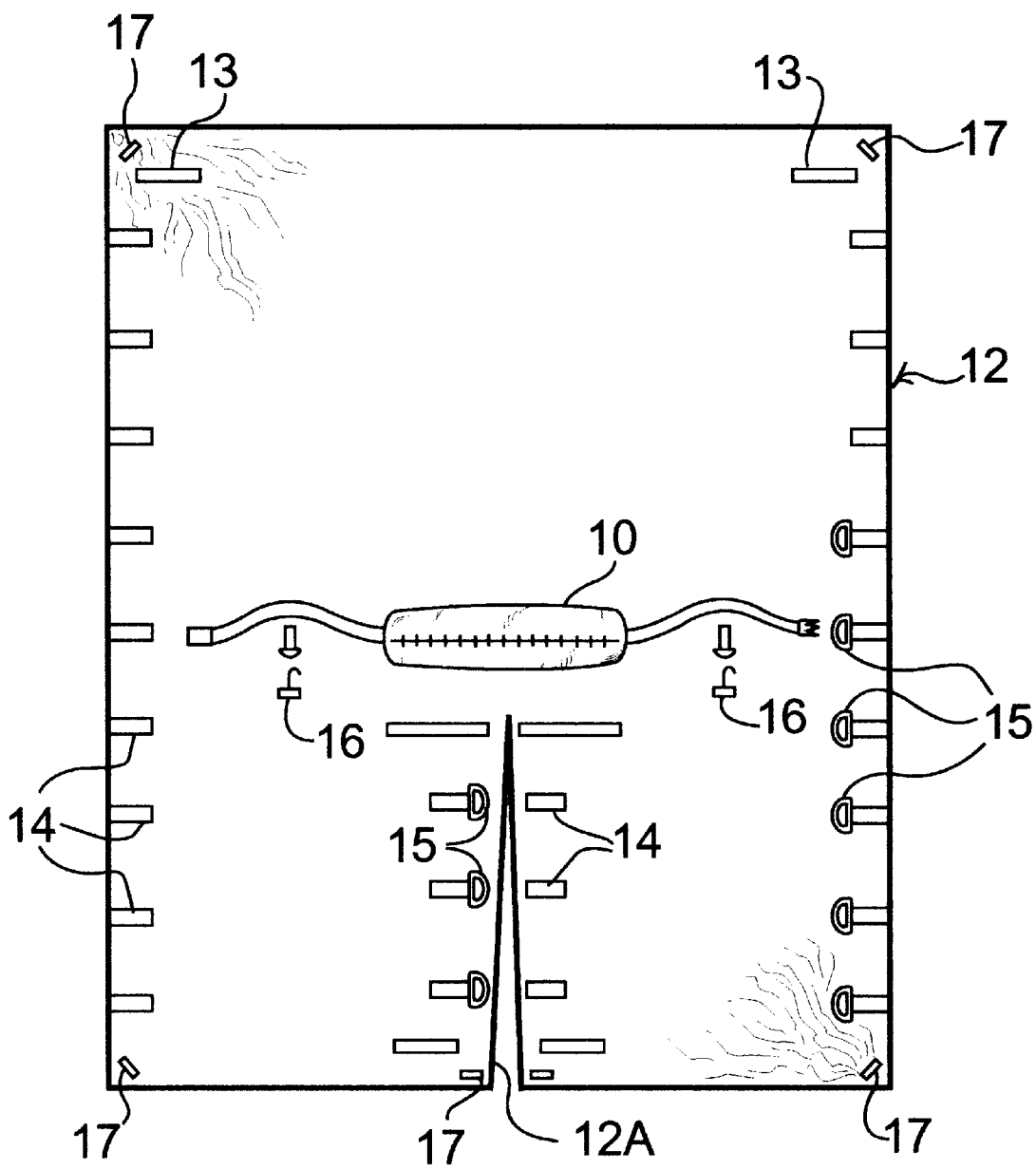
FIG. 1 is a plan view of one embodiment of the camouflage system.

The supple, one-way translucent (i.e. a person can see out through the material but one outside cannot see in) camouflage material preferably used in this invention is formed of a rectangular sheet with the characteristics and features described below and illustrated in the drawings. In the central portion of the sheet is an integral fanny pack, which allows the system to be easily folded and rolled into for storage. The system is fabricated with a series of spaced hook and loop fastener straps 14 secured along one side and spaced D rings 15 along the opposing edge. A slit extends upwardly from the bottom edge toward the center section of the sheet (ending at the base of the fanny pack), to which matching spaced hook and loop fastener straps are attached on one inside edge, identically spaced D rings are attached to the opposing inside edge. Two nylon web hand loops 13 are attached to the corners of the upper section of the sheet. Hook and loop fastener straps 18 and 19 are provided at the ankle and thigh level, respectively, on each side of the slit on the lower section of the sheet. Two D rings are attached to the sheet on each side of the slit beginning approximately six inches below the level of the belt and spaced six inches apart going toward the bottom of the sheet. These D rings match to the clips 16 attached to the belt at the front position while worn. The D rings can be attached to the clips while the system is being worn to raise the level of the leg length for a "one size" application. Additionally, reinforced cord loops 17 are attached at each of the four outside corners of the sheet for tie downs or stake locations while in use as a stationary blind.

The sheet of camouflage material is contained in a fanny pack 10 which is strapped around the waist of the user. The fanny pack should be to the rear. The size of the sheet may be, for example, about 9 feet by 6 feet wide and is preferably rectangular in shape, as shown in the drawings. In order to deploy the camouflage material, unzip the fanny pack 10 and allow the material 12 to unroll. Preferred configurations for deployment are as follows:

Configuration 1, Prone Position or Low Crawl

Should the user need to be in the prone position (or low crawl), simply fasten the outside straps 14 (which include VELCRO brand hook and loop fasteners) around the thighs and ankles of both legs through the D-rings 15. Pull the upper section of the material over the head and hold with supplied handles 13 at the top of the material. This allows the user maximum break-up of the human form, while insuring the body remains covered. By utilizing the ankle straps 18 and thigh straps 19 as well as the hand loops 13, the material stays over the length of the back side of the entire body of the user, maintaining cover and removing the form of the body while not hindering movement by being under the cover while crawling. This arrangement also prevents wear and tear of the material because the material is not located under the crawling person. The sheet of material is large enough to cover both the user and his/her equipment including a backpack and/or rifle, camera equipment, etc. Additionally, the user maintains outward visibility while being completely under cover by use of the translucent material.

Configuration 2, Low Mobility Position

While keeping the system on the body, unzip the fanny pack, unroll the material and reach between the legs to attach the slit together by use of the D rings and opposing hook and loop straps. Once the slit is attached or closed, repeat this step in the front by attaching D rings and opposing hook and loop straps up the front of the system to the desired level. If the straps are attached to the top, a "tube" will be created, or the user may opt to stop several straps from the top and bring the remaining material over the head creating a "flap" or "veil". The upper portion of the system has intentionally been designed without the appearance of a garment (i.e. there are no sleeves, hood, tight torso cover, etc) in order to more efficiently remove the human form from visibility as well as enable free load bearing. By use of this configuration, the form of the human body is completely removed, but walking and slower mobility by the user is not affected. This configuration is also useful as tree stand. The upper "body" of this system is large enough to cover both the user as well as his/her equipment (e.g. backpack, rifle, camera equipment, etc.). Additionally, the user maintains outward visibility while under cover of the system by use of the one-way translucent material.

For quick release of the entire system, simply release the belt buckle of the fanny pack at the waist, and allow the material to slide to the ground, then step out and go.

Configuration 3, High Mobility

While keeping the system attached to the body, unzip the fanny pack, unroll the material and reach between the legs to attach the rear sides of the slit to their opposing front sides, both left and right, by use of the attached D rings and their opposing hook and loop fastener straps. This will create pant legs, the amount of material on either side is adequate to maintain a very loose fit, therefore maintaining the masking of the human form. Depending upon the height of the user, adjust the length of the legs up if necessary by use of the attached D rings which are on the front side of the thigh area and opposing clips on the belt. Once the legs are formed, the remaining material is wrapped around the torso and attached by means of D rings and opposing hook and loop fastener straps. If the straps are attached to the top a "tube" will be created, or the user may opt to stop several straps from the top and bring the remaining material over the head creating a "flap" or "veil". The user may walk, run, crawl, or climb freely and without hindrance. The upper "body" of the system is large enough to cover both the user and his/her equipment. Also, the user maintains outward visibility while under cover.

Configuration 4, Fixed or Stationary Blind

The system must be removed from the body and must be unrolled from the fanny pack. While lying the system flat, with the strap side up, fasten the center slit together by use of the opposing D rings and hook and loop fastener straps. Attach the system to either existing vegetation or structure by means of cord tie downs. One possible configuration is folding the system over at the center of the sheet between two trees with a cord in between and attaching both sides down at an angle like a tent. This configuration will allow the user to utilize the slit as an access/exit door.

Repackaging the System

Figure 2A:
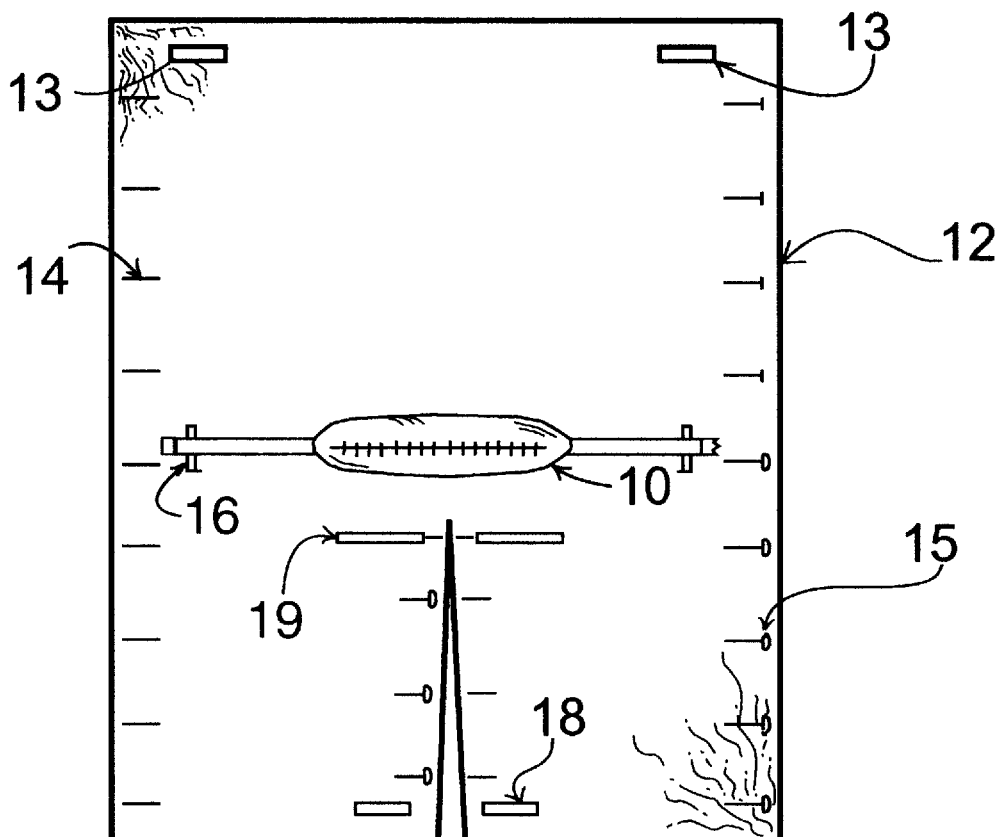
FIG. 2A is a plan view of another embodiment of the system of the invention.

Disconnect all "D" rings and straps that have been used. Disconnect the waist belt for the fanny pack 10. Lay the unit out as shown in FIG. 2A. Lay the system flat with fanny pack down.

Figure 2B:
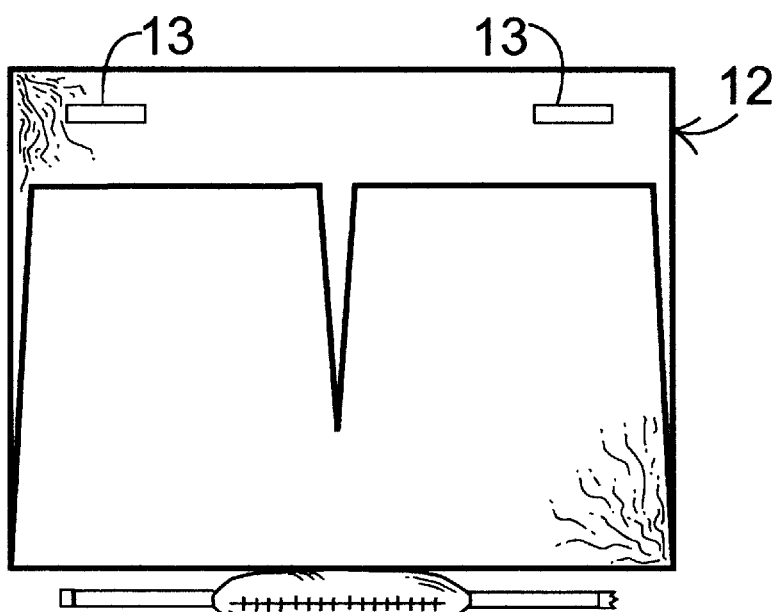

Fold the bottom section of the sheet material 12 up and over the top section until the fanny pack is uncovered, as shown in FIG. 2B.

Fold sheet material 12 into four equal sections, starting from the outside working toward the center, as seen in FIG. 2C.

After the system has been folded as seen in FIG. 2D, it can now be rolled up and placed inside the fanny pack.

The camouflage system can be provided in any design size, color pattern, etc. Other variants are also possible without departing from the present invention. Although VELCRO brand fastener systems (i.e., hook and loop mating fasteners) are preferred for use herein, other conventional fastening systems may also be used. The slit 12A extends preferably less than about one-half the length between the bottom edge and the top edge of the camouflage sheet, as shown in FIG. 1. The slit is positioned mid-way between the opposing side edges of the sheet.

It is also possible to use the system as a ground sheet by laying the material flat on the ground (as shown in FIG. 1, for example, and then tying the corners of the sheet to stakes, trees, etc. with ropes or cords attached to the corner loops 17.

It is also possible to tie the sheet up so that it can be used as a screen. This enables the user to position himself behind the screen when desired.

Other variants are possible without departing from the scope of this invention.

What is claimed is:

1. An individual camouflage system capable of camouflaging an individual while breaking up the human form comprising:

(a) a flexible rectangular sleeveless sheet of camouflage material having opposing side edges and opposing top and bottom edges; wherein said top edge includes first and second corners: further comprising a slit extending upwardly from said bottom edge mid-way between said opposing side edges and terminating at a point less than one-half the distance between said bottom and top edges; further comprising a plurality of spaced straps along one said side edge and a plurality of spaced D-rings along the other said side edge; and further comprising spaced straps and spaced D-rings on opposite sides of said slit;

(b) first and second hand loops secured to said sheet at said first and second corners, respectively, for enabling said individual to grasp said hand loops and pull said sheet over the head of said individual; and (c) a fanny pack secured to said camouflage material, said fanny pack including a belt for surrounding the waist of the user; wherein said fanny pack is centrally located on said sheet of camouflage material; wherein said sheet of camouflage material can be folded and stored within said fanny pack.

2. A camouflage system in accordance with claim 1, further comprising first and second ankle loops secured on said sheet near said bottom edge on opposite sides of said slit; wherein said ankle loops each comprise a hook and loop fastener stray for securing said loops around the ankles of said individual.

3. The camouflage system in accordance with claim 2, further comprising first and second thigh straps secured on said sheet for encircling the thighs of said individual when in a prone or low crawl position.

4. The camouflage system in accordance with claim 1, wherein said bottom edge includes first and second outside corners; further comprising a tie down loop attached to said sheet at each of said corners enabling said sheet to be secured to the ground.

* * * * *